United States Patent
Wu et al.

(10) Patent No.: US 12,524,502 B2
(45) Date of Patent: Jan. 13, 2026

(54) EXPLAINABLE CLUSTER-BASED COLLABORATIVE FILTERING

(71) Applicant: Microsoft Technology Licensing, LLC, Redmond, WA (US)

(72) Inventors: Mingqi Wu, Bellevue, WA (US); Jianxun Lian, Beijing (CN); Yuntao Du, Beijing (CN); Jing Yao, Beijing (CN); Xiting Wang, Beijing (CN); Bei Lu, Sammamish, WA (US); Xing Xie, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 126 days.

(21) Appl. No.: 18/191,681

(22) Filed: Mar. 28, 2023

(65) Prior Publication Data
US 2024/0330411 A1    Oct. 3, 2024

(51) Int. Cl.
*G06F 18/232*    (2023.01)
*G06F 16/2457*   (2019.01)

(52) U.S. Cl.
CPC ...... *G06F 18/232* (2023.01); *G06F 16/24575* (2019.01)

(58) Field of Classification Search
None
See application file for complete search history.

(56) References Cited

U.S. PATENT DOCUMENTS

| | | | |
|---|---|---|---|
| 11,580,153 B1* | 2/2023 | Liao | G06F 16/437 |
| 2013/0212115 A1* | 8/2013 | Yerli | G06Q 50/01 |
| | | | 707/749 |
| 2016/0162591 A1* | 6/2016 | Dokania | G06F 16/955 |
| | | | 707/738 |
| 2017/0061016 A1* | 3/2017 | Lytkin | G06Q 30/0201 |
| 2020/0027171 A1* | 1/2020 | Oren | G06Q 50/01 |
| 2021/0406761 A1* | 12/2021 | Yang | G06Q 30/0251 |
| 2022/0188358 A1* | 6/2022 | Hung | G06F 16/9535 |

FOREIGN PATENT DOCUMENTS

WO    2021262380 A1    12/2021

OTHER PUBLICATIONS

International Search Report and Written Opinion received for PCT Application No. PCT/US2024/019628, May 10, 2024, 13 pages.
(Continued)

*Primary Examiner* — Thu N Nguyen
(74) *Attorney, Agent, or Firm* — Ray Quinney & Nebeker P.C.; John O. Carpenter

(57) ABSTRACT

A method for providing recommendations to a user includes assigning one or more item tags from a known set of tags to one or more items of a plurality of items; assigning one or more user tags from the known set of tags to a user; determining at least one taste cluster having one or more cluster tags from the known set of tags, wherein the taste cluster shares at least one shared tag with the one or more user tags and with the one or more item tags; affiliating at least one item of the plurality of items with the taste cluster based on the shared tag; affiliating the user with the taste cluster based on the shared tag; and presenting to the user at least one presented item of the plurality of items affiliated with the taste cluster.

20 Claims, 6 Drawing Sheets

(56) References Cited

OTHER PUBLICATIONS

Rafailidis, et al., "The TFC Model: Tensor Factorization and Tag Clustering for Item Recommendation in Social Tagging Systems", IEEE Transactions on Systems, Man, and Cybernetics: Systems, IEEE, Piscataway, NJ, USA, vol. 43, Issue No. 3, May 1, 2013, pp. 673-688.
Wang, et al., "Disentangled Representation Learning", retrieve from: arxiv logo>cs>arXiv:2211.11695, Nov. 21, 2022, pp. 1-22.
"Last.fm Music Discovery API", Retrieved From: https://www.last.fm/api, Retrieved on: Oct. 31, 2022, 2 Pages.
"Pd90506 / AMCF", Retrieved From: https://github.com/pd90506/AMCF, Apr. 25, 2020, 2 Pages.
"Xbox Game Pass", Retrieved From: https://www.xbox.com/en-US/xbox-game-pass, Retrieved on: Oct. 31, 2022, 7 Pages.
Abdollahi, et al., "Explainable Matrix Factorization for Collaborative Filtering", In Proceedings of the 25th International Conference Companion on World Wide Web, Apr. 11, 2016, 2 Pages.
Belghazi, et al., "Mutual Information Neural Estimation", In Proceedings of the 35th International Conference on Machine Learning, Jul. 3, 2018, 10 Pages.
Chen, et al., "Neural Attentional Rating Regression with Review-level Explanations", In Proceedings of the World Wide Web Conference, Apr. 10, 2018, pp. 1583-1592.
Chen, et al., "Personalized Fashion Recommendation with Visual Explanations based on Multimodal Attention Network: Towards Visually Explainable Recommendation", In Proceedings of the 42nd International ACM SIGIR Conference on Research and Development in Information Retrieval, Jul. 18, 2019, pp. 765-774.
Cheng, et al., "Aspect-Aware Latent Factor Model: Rating Prediction with Ratings and Reviews", In Proceedings of the 2018 World Wide Web Conference, Apr. 23, 2018, pp. 639-648.
Diemert, et al., "A Large Scale Benchmark for Uplift Modeling", In Publication of KDD, August, 2018, 7 Pages.
Fusco, et al., "RecoNet: An Interpretable Neural Architecture for Recommender Systems", In Proceedings of the Twenty-Eighth International Joint Conference on Artificial Intelligence, Aug. 10, 2019, pp. 2343-2349.
Geng, et al., "Path Language Modeling over Knowledge Graphsfor Explainable Recommendation", In Proceedings of the ACM Web Conference, Apr. 25, 2022, 10 Pages.
He, et al., "LightGCN: Simplifying and Powering Graph Convolution Network for Recommendation", In Proceedings of the 43rd International ACM SIGIR Conference on Research and Development in Information Retrieval, Jul. 25, 2020, 10 Pages.
He, et al., "Neural Collaborative Filtering", In Proceedings of the 26th International Conference on World Wide Web, Apr. 3, 2017, pp. 173-182.
He, et al., "TriRank: Review-aware Explainable Recommendation by Modeling Aspects", In Proceedings of the 24th ACM International on Conference on Information and Knowledge Management, Oct. 17, 2015, 10 Pages.
Huang, et al., "Customer churn prediction in telecommunications", In Journal of Expert Systems with Applications vol. 39, Issue 1, Jan. 2012, pp. 1414-1425.
Jacobson, et al., "Music Personalization at Spotify", In Proceedings of the 10th ACM Conference on Recommender Systems, Sep. 7, 2016, pp. 373-373.
Jang, et al., "Categorical Reparameterization With Gumbel-Softmax", In Proceedings of International Conference on Learning Representations, Feb. 6, 2017, 12 Pages.
Kingma, et al., "Adam: A Method For Stochastic Optimization", In Repository of arXiv:1412.6980v9, Jan. 30, 2017, 15 Pages.
Koren, Yehuda, "Factorization Meets The Neighborhood: A Multi-faceted Collaborative Filtering Model", In Proceedings of the 14th ACM SIGKDD international conference on Knowledge discovery and data mining, Aug. 24, 2008, pp. 426-434.
Koren, et al., "Matrix Factorization Techniques for Recommender Systems", In Journal of Computer, vol. 42, Issue 8, Aug. 7, 2009, pp. 30-37.
Liu, et al., "Hi-Fi Ark: Deep User Representation via High-Fidelity Archive Network", In Proceedings of the Twenty-Eighth International Joint Conference on Artificial Intelligence, Aug. 10, 2019, pp. 3059-3065.
Liu, et al., "Real-time Attention Based Look-alike Model for Recommender System", In Repository of arXiv:1906.05022v1, Jun. 12, 2019, 9 Pages.
Ma, et al., "A Sub-linear, Massive-scale Look-alike Audience Extension System A Massive-scale Look-alike Audience Extension", In Proceedings of the 5th International Workshop on Big Data, Streams and Heterogeneous Source Mining: Algorithms, Systems, Programming Models and Applications, Dec. 6, 2016, pp. 51-67.
Mao, et al., "UltraGCN: Ultra Simplification of Graph Convolutional Networks for Recommendation", In Proceedings of 30th ACM International Conference on Information & Knowledge Management, Nov. 1, 2021, pp. 1253-1262.
Mcauley, et al., "Hidden Factors And Hidden Topics: Understanding Rating Dimensions With Review Text", In Proceedings of the 7th ACM conference on Recommender systems, Oct. 12, 2013, 10 Pages.
Pan, et al., "Explainable Recommendation via Interpretable Feature Mapping and Evaluation of Explainability", In Proceedings of the Twenty-Ninth International Joint Conference on Artificial Intelligence, Jul. 2020, pp. 2690-2696.
Peake, et al., "Explanation Mining: Post Hoc Interpretability of Latent Factor Models for Recommendation Systems", In Proceedings of the 24th ACM SIGKDD International Conference on Knowledge Discovery & Data Mining, Aug. 19, 2018, pp. 2060-2069.
Provost, et al., "Audience selection for on-line brand advertising: privacy-friendly social network targeting", In Proceedings of the 15th ACM SIGKDD International Conference on Knowledge Discovery and Data Mining, Jun. 28, 2009, pp. 707-716.
Rendle, et al., "BPR: Bayesian Personalized Ranking from Implicit Feedback", In Proceedings of the Twenty-Fifth Conference on Uncertainty in Artificial Intelligence, Jun. 18, 2009, pp. 452-461.
Sarwar, et al., "Item-based collaborative filtering recommendation algorithms", In Proceedings of the 10th International Conference on World Wide Web, Apr. 1, 2001, pp. 285-295.
Székely, et al., "Measuring and testing dependence by correlation of distances", In Journal of the Annals of Statistics, vol. 35, Issue 6, Dec. 2007, pp. 2769-2794.
Tan, et al., "Rating-Boosted Latent Topics: Understanding Users and Items with Ratings and Reviews", In Proceedings of the Twenty-Fifth International Joint Conference on Artificial Intelligence, Jul. 9, 2016, pp. 2640-2646.
Tang, et al., "Learning to Rank Audience for Behavioral Targeting in Display ADS", In Proceedings of the 20th ACM International Conference on Information and Knowledge Management, Oct. 24, 2011, pp. 605-610.
Vig, et al., "Tagsplanations: Explaining Recommendations using Tags", In Proceedings of the 14th International Conference on Intelligent user Interfaces, Feb. 8, 2009, 10 Pages.
Wang, et al., "Explainable Reasoning over Knowledge Graphs for Recommendation", In Journal of AAAI, vol. 33, Issue 1, Jul. 17, 2019, pp. 5329-5336.
Wang, et al., "Explainable Recommendation via Multi-Task Learning in Opinionated Text Data", In Proceedings of the 41st International ACM SIGIR Conference on Research & Development in Information Retrieval, Jun. 27, 2018, pp. 165-174.
Wang, et al., "Learning Intents Behind Interactions with Knowledge Graph for Recommendation", In Proceedings of the Web Conference, Jun. 3, 2021, pp. 878-887.
Wang, et al., "TEM: Tree-enhanced Embedding Model for Explainable Recommendation", In Proceedings of the 2018 World Wide Web Conference, Apr. 10, 2018, pp. 1543-1552.

(56) References Cited

OTHER PUBLICATIONS

Wu, et al., "Collaborative Denoising Auto-Encoders for Top-N Recommender Systems", In Proceedings of the Ninth ACM International Conference on Web Search and Data Mining, Feb. 8, 2016, 10 Pages.

Wu, et al., "FLAME: A Probabilistic Model Combining Aspect Based Opinion Mining and Collaborative Filtering", In Proceedings of the Eighth ACM International Conference on Web Search and Data Mining, Feb. 2, 2015, 10 Pages.

Zhang, et al., "Explainable Recommendation: A Survey and New Perspectives", In Journal of Foundations and Trends in Information Retrieval, vol. 14, Issue 1, Mar. 11, 2020, 109 Pages.

Zhang, et al., "Explicit Factor Models for Explainable Recommendation based on Phrase-level Sentiment Analysis", In Proceedings of the 37th international ACM SIGIR Conference on Research & Development in Information Retrieval, Jul. 3, 2014, 10 Pages.

Zhang, et al., "GateFormer: Speeding Up News Feed Recommendation with Input Gated Transformers", In Repository of arXiv:2201.04406v1, Jan. 12, 2022, 11 Pages.

* cited by examiner

EXPLAINABLE CLUSTER-BASED COLLABORATIVE FILTERING

BACKGROUND

Background and Relevant Art

Collaborative filtering (CF) is an effective and widely used technique for recommender systems. Existing CF methods mainly focus on improving the accuracy with deep learning models, while the explainability of recommender systems remains inadequate.

BRIEF SUMMARY

In some embodiments, a method for providing recommendations to a user includes assigning one or more item tags from a known set of tags to one or more items of a plurality of items; assigning one or more user tags from the known set of tags to a user; determining at least one taste cluster having one or more cluster tags from the known set of tags, wherein the taste cluster shares at least one shared tag with the one or more user tags and with the one or more item tags; affiliating at least one item of the plurality of items with the taste cluster based on the shared tag; affiliating the user with the taste cluster based on the shared tag; and presenting to the user at least one presented item of the plurality of items affiliated with the taste cluster.

In some embodiments, a method of training an explainable collaborative filtering model includes generating a plurality of taste clusters based at least partially on a plurality of items having item tags associated therewith; calculating at least one explanation loss function of the plurality of taste clusters; calculating a collaborative filtering loss for the taste clusters; and explaining the taste clusters using a total loss based on at least the at least one explanation loss function and the collaborative filtering loss.

In some embodiments, a non-transitory computer readable media has instructions stored thereon that, when executed by a processor of a computing device, cause the computer device to assign one or more item tags from a known set of tags to one or more items of a plurality of items; assign one or more user tags from the known set of tags to a user; determine at least one taste cluster having one or more cluster tags from the known set of tags, wherein the taste cluster shares at least one shared tag with the one or more user tags and with the one or more item tags; affiliate at least one item of the plurality of items with the taste cluster based on the shared tag; affiliate the user with the taste cluster based on the shared tag; and present to the user at least one presented item of the plurality of items affiliated with the taste cluster.

This Summary is provided to introduce a selection of concepts in a simplified form that are further described below in the Detailed Description. This Summary is not intended to identify key features or essential features of the claimed subject matter. Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Figure 1:
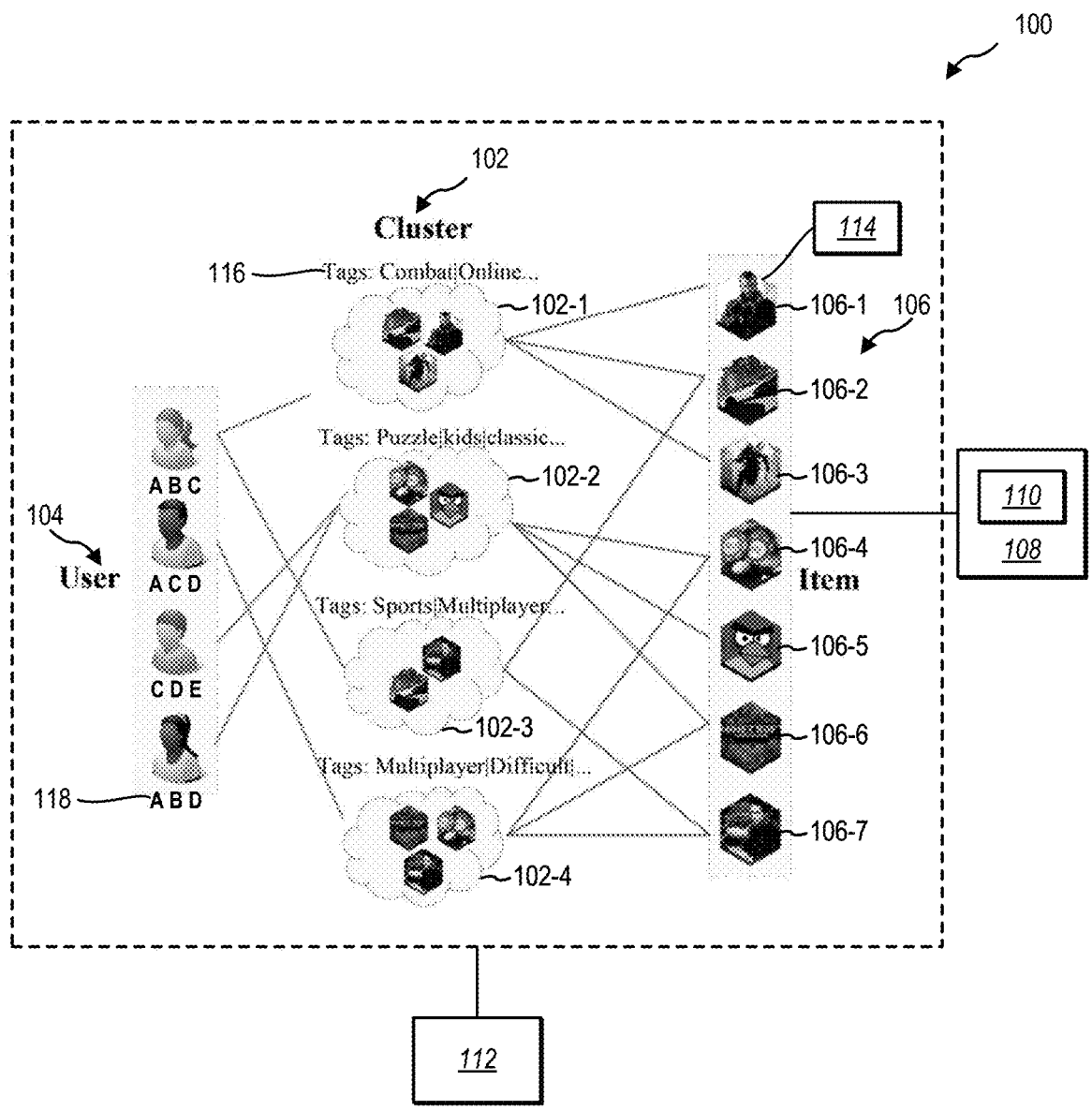
FIG. 1 is a schematic illustration of an ECF model framework, according to at least some embodiments of the present disclosure.

The present disclosure generally relates to systems and methods for providing effective Explainable Collaborative Filtering (ECF) models based on learning interpretable clusters. ECF models and methods of training ECF models according to the present disclosure provides accuracy, coherency, and self-explainability.

In some embodiments, according to the present disclosure, an ECF model provides item recommendations to a user based on one or more intermediate taste clusters. The taste clusters are generated based on a plurality of known tags, properties, or other identifiers that may be associated with a plurality of items and the user. The taste clusters are evaluated based on a variety of metrics to determine the informativeness, the uniqueness, and the accuracy of the recommendations. For example, loss functions may individually quantify the in-cluster item coverage of the taste cluster, the tag utilization of the taste cluster, the silhouette of the taste cluster, the informativeness of the taste cluster, or other metrics to evaluate and explain the recommendations.

To further evaluate and explain the recommendations, in some embodiments, a recommendation provided by the ECF model is quantified by an item affiliation score between the taste cluster and the recommended item and by a user affiliation score between the taste cluster and the user. The user affiliation score quantifies the similarities between the user's preferences and the taste cluster, while the item affiliation score quantifies the similarities between item description (or other characteristics) and the taste cluster. A combined affiliation score combines the user affiliation score with the item affiliation score to provide a quantified and explainable recommendation to a user. In at least one instance, the affiliation scores can improve user trust in the recommendation to improve conversion or acceptance of the recommendation. In at least one instance, the affiliation scores can provide a quantified and explainable record of the recommendation(s) to a technician or engineer for evaluation and review of the ECF model.

Conventional collaborative filtering (CF) is a technique for recommender systems. The rationale behind CF is that a user's potential interests can be inferred from a group of like-minded users' behaviors (e.g., user-based CF), or a set of similar items to the user's behavior history (e.g., item-based CF). Conventional methods for CF can be categorized into two types: memory-based CF and model-based CF. Memory-based CF methods explicitly find the neighborhood of users/items for preference inference. These methods can suffer from technical issues, such as memory consumption, (inference) computational cost, and data sparsity issues. In contrast, model-based CF uses machine learning methods to help model the relationship between users and items. Model-based CF methods have evolved from latent factorization-based methods to neural embedding-based methods, and to recently neural graph-based methods. The foundation model in this direction is to represent users and items with high-quality latent factor embeddings, so that users' preference towards items can be decoded from the latent embeddings.

However, latent factor-based CF suffers from a lack of transparency and explainability. Knowing the decision logic of recommender algorithms rather than using them as black boxes is important on multiple aspects, such as assisting developers in model debugging and abnormal case studies or generating persuasive explanations to promote the recommended items and increase conversion rates. In other examples, quantification of one or more portions of the recommender algorithms may be surfaced to a user to provide trust in the recommendation and/or allow the user to better decide between recommendations.

For example, a taste cluster according to the present disclosure is an intermediate cluster in the model that is associated with a group of items which are not only similar in users' latent interest space, but also explicitly share some common tags, so that the overlapping tags can be selected as descriptive interpretation for the taste cluster. Both users and items are mapped to multiple taste clusters. On the one hand, item recommendations can be made by measuring the coherence between users' and items' taste cluster affiliations; on the other hand, the descriptive tags interpret what determines users' preference towards items.

The ECF model uses a plurality of known tags, properties, or other identifiers (collectively "tags") to assign qualities to the items, taste clusters, and user(s) such that the qualities can be compared between the items, taste clusters, and user(s). In some embodiments, the signal that a user provides about their preference(s) is implicit (e.g., review and click, prior interactions, time spent interacting, type of interactions). Let U be a set of users and I a set of items. In such an example, the user-item interaction matrix may be:

$$Y \in R^{|U| \times |I|}$$

where $y_{ui}=1$ means that there is an interaction between user u and item i, otherwise $y_{ui}=0$.

There is a plurality of known tags T for items, and each item i has a subset of tags $T_i$ to describe its genre and features. In some examples, the items being recommended to a user are interactive software applications, such as computer games. The subset $T_i$ for a computer game may describe the genre of the game and features of the game such as gameplay modes, year of release, publisher, number of local players, online compatibility, or any other features or properties of the item that a user may rely upon for making a decision regarding interactions with the item. For example, a user may choose to purchase, download, or play a computer game based on the genre, the publisher, and the availability of online multiplayer.

Given the interactions data Y and items' tags T, in some embodiments, ECF models, according to the present disclosure predict how likely user u would adopt or interact with item i, and explain what determines the recommendation of item i to user u with the descriptions from tags T.

FIG. 1 is a schematic illustration of an ECF model framework 100. The framework 100 includes a plurality of taste clusters 102 that connect a plurality of users 104 to a plurality of items 106. The taste clusters 102, users 104, and items 106 are all associated with a plurality of known tags 108 used to describe the items 106. In some embodiments, the plurality of known tags 108 is obtained from an item database 110. For example, the plurality of known tags 108 is accessed from the item database 110 directly, wherein the item database 110 includes a list of known tags 108 that may be used to query or classify items in the item database 110. In other examples, the framework 100 creates the plurality of known tags 108 based on the item database or other database of user interactions with the items or item database 110.

For example, the plurality of known tags 108 may be previously established by a developer, publisher, or other entity that manages the item database 110, either directly or indirectly. In some examples, the plurality of known tags 108 may be or include community tags that are provided by users describing or interacting with the items or item database. In such an example, the framework may access or otherwise obtain user-generated content 112, such as reviews, of items 106 to populate or further populate the plurality of known tags 108. In other embodiments, the framework may use generative artificial intelligence models or other machine learning models to populate or further populate the plurality of known tags 108. In some embodiments, the generative artificial intelligence model is a generative adversarial network (GAN). In some embodiments, a GAN consists of two neural networks: a generator that creates new data and a discriminator that evaluates the data. The generator and discriminator networks work together, with the generator improving its outputs based on the feedback it receives from the discriminator.

In some embodiments, each item 106-1, 106-2, 106-3, 106-4, 106-5, 106-6, 106-7 of the plurality of items 106 includes one or more item tags 114 (such as $T_i$ as described herein) assigned thereto. The item tags 114 describe each item 106-1, 106-2, 106-3, 106-4, 106-5, 106-6, 106-7 relative to one another and using the plurality of known tags 108 such that the differences between the items 106 are determinable.

In some embodiments, taste clusters 102 are generated based on the items 106 and item tags 114 associated therewith. A taste cluster is, in some embodiments, a collection of items $c=\{i_1, i_2, \ldots, i_c\}$, which can not only allow the framework 100 to determine a latent interest of users, but also be explicitly identified with common tags shared by items within the taste cluster. Additionally, each taste cluster may be associated with a set of cluster tags 116 $T_c=\{t_1, t_2, \ldots, t_k\}$, which are derived from corresponding item sets and acts as a description for the cluster. Assuming there is a set of taste clusters C={c}, users and/or items may be mapped to these taste clusters with a sparse affiliation matrix.

In at least one example, $A \in R^{|U| \times |C|}$ and $X \in R^{|I| \times |C|}$ define affiliation matrices between users and taste clusters and between items and taste clusters, respectively. Each entry $a_{uc}$ in A denotes the preference degree of user u to taste cluster c, and each entry $x_{ic}$ denotes the relatedness between item i and taste cluster c. In some embodiments, to improve the readability and persuasiveness of the explanation, the affiliation matrix is allowed to be sparse (i.e., only the most relevant entries are non-zero values), so that the user preference and item belongings can be identified with only a few taste clusters. In some examples, users 104 and items 106 are mapped to multiple taste clusters 102, and the ECF framework 100 can make user-item recommendation and explanation with taste clusters and affiliations as follows.

Conventional clustering algorithms (e.g., K-means) for items or blindly collecting items with same tags both fail to encode both user interest and item profiles simultaneously, rendering the framework unable to quantity the relationships therebetween. In some embodiments, the taste clusters 102 may be generated by representing items 106 and taste clusters 102 as embeddings, and measure their affiliations with cosine similarity:

$$\tilde{x}_{ic} = \cos(v_i, h_c)$$

where $v \in R^d$ and $h \in R^d$ are the embeddings of items and clusters, and d is the embedding size. To clearly identify the clusters between items and clusters, a predetermined quantity of clusters is considered for each item. For example, the clusters may be determined by:

$$m_{ic} = \begin{cases} 1 & \text{if } c \in \arg Topm(\tilde{x}_i) \\ 0 & \text{otherwise} \end{cases}$$

$$x_i = \sigma(\tilde{x}_i) \odot m_i,$$

where $\odot$ denotes Hadamard product, and $\sigma(\cdot)$ is the sigmoid function. The above functions select the Top-m selections for each item according to the similarity scores determined by the cosine similarity between the embedding vectors. The functions then apply the sigmoid function to indicate the relatedness of items and clusters with non-zero probabilities. The functions then apply a binary mask to filter other less-relevant clusters and obtain the final item-cluster affiliation matrix X. In the above-described embodiment, the result cannot be optimized by gradient, for example because of the discrete nature of the argTop operation. To render the result useful for the framework, the computation is relaxed by a tempered softmax:

$$m_{ic} \approx \tilde{m}_{ic} = \frac{\exp(\cos(v_i, h_c)/T)}{\sum_c \exp(\cos(v_i, h_c)/T)}$$

where T is a hyperparameter called temperature, which control the entropy of the distribution. Thus, for back-propagation, the continuous relaxation $\tilde{m}_{ic}$ is used to approximate $m_{ic}$. However, when calculating the probability of taste clusters, the framework directly uses $m_{ic}$ instead of $\tilde{m}_{ic}$, to be consistent with the real affiliation relationship.

In some embodiments, a disparity between the forward pass and backward pass is reduced by reparameterization of $m_{ic}$ by rewriting as:

$$\hat{m}_{ic} = \tilde{m}_{ic} + \text{detach\_gradient}(m_{ic} - \tilde{m}_{ic})$$

where the detach_gradient function will prevent the gradient from back-propagating through it. In the forward pass, detach_gradient has no effect; and therefore, the affiliated clusters can be directly determined by argTop operation. In some embodiments, in the backward pass, detach_gradient takes effect, and:

$$\nabla_{\hat{m}_{ic}} \mathcal{L} = \nabla_{\tilde{m}_{ic}} \mathcal{L}$$

and, therefore, the computation is differentiable.

In some embodiments, a similar calculation is used to obtain user affiliations between the users and the taste clusters. In at least one embodiment, the user-cluster similarly matrix is calculated as:

$$\tilde{A} = Y \times \tilde{X}$$

where Y is the user-item interaction matrix. In some embodiments, the user-cluster affiliation matrix includes Top-n taste clusters for each user to derive the user-cluster affiliation matrix.

Due to the hidden nature of users' interest space, it may be difficult to determine a quantity of taste clusters to model user preference accurately and/or precisely. In some embodiments, the framework 100 uses a forest mechanism to improve the diversity and accuracy of recommendation. The forest mechanism enhances the expressiveness of taste clusters, while also maintaining explainability. Specifically, for each ECF model, |C| items are selected as the initial taste clusters and different random seeds are used for model training. In some embodiments, F different instances are trained to form a final ECF model, and the final prediction is based on the summation of all M models. In at least one example, a forest mechanism boosts the performance of the ECF model and provides a comprehensive explanation for predictions.

A result of determining the taste clusters 102 in this manner is that, in some embodiments, each taste cluster 102-1, 102-2, 102-3, 102-4 of the plurality of items 106 includes one or more item tags 114 (such as $T_i$ as described herein) assigned thereto. The item tags 114 describe each item 106-1, 106-2, 106-3, 106-4, 106-5 relative to one another, and use the plurality of known tags 108 such that the differences between the items 106 are determinable. Similarly, the cluster tags 116 are assigned to each taste cluster 102-1, 102-2, 102-3, 102-4 determined by the above described method from the plurality of known tags 108. In some embodiments, the users 104 are further described by user tags 118 from the plurality of known tags 108, allowing each of the taste clusters 102, users 104, and items 106 to be described using the same terms.

In some embodiments, the user's descriptions, affiliations, and/or interactions are obtained from a user profile or account that may be populated with records of interactions with items in the item database 110 or other items with tags or other descriptions related to the known tags 108. In some embodiments, the item descriptions are obtained from the item database 110 or items 106 themselves, such as when the items include metadata or have additional descriptions associated therewith. In some embodiments, the framework 100 includes optical character recognition (OCR), virtual object detection, animation detection, other video information analysis, or machine learning models that allow the framework 100 to obtain or determine tags for an item 106 that otherwise lacks tags. In the example of a newly released interactive software application, the item may lack assigned tags, while object recognition during gameplay may allow the framework or a machine learning model to identify aspects of the interactive software application and begin populating tags for the item 106 based at least partially on the available known tags 108. In other examples, the item 106 may have one or more tags based at least partially on community item information, such as reviews or community-based statistics. In at least one example, a game that is favorably reviewed with a high quantity of mentions of the graphical fidelity may have a tag assigned thereto indicating high graphical fidelity or quality. In at least another example, a community may predominantly play the game in competitive online multiplayer modes, and the game may have a tag assigned thereto indicating the popularity of the competitive online multiplayer modes.

Figure 2:
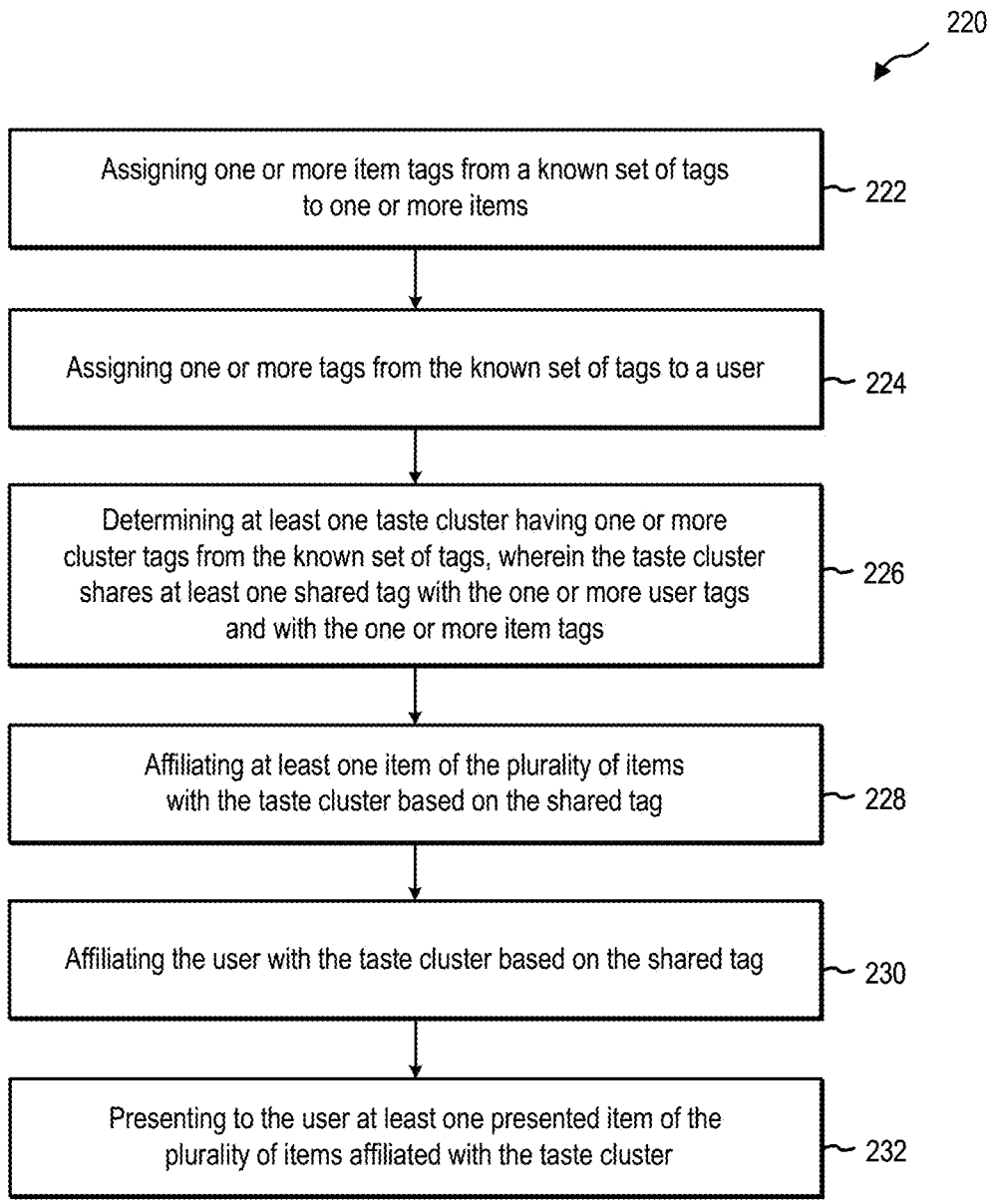
FIG. 2 is a flowchart illustrating an embodiment of a method of recommending an item to a user with an ECF framework, according to at least some embodiments of the present disclosure.

FIG. 2 is a flowchart illustrating an embodiment of a method 220 of recommending an item to a user with an ECF framework, such as that described in relation to FIG. 1. In some embodiments, the method 220 includes assigning one or more item tags from a known set of tags to one or more items at 222 and assigning one or more user tags from the known set of tags to a user at 224. The item tags may be assigned according to the item database or by object or image recognition, as described in relation to FIG. 1.

In some embodiments, the method 220 includes determining at least one taste cluster having one or more cluster tags from the known set of tags at 226. The taste cluster may be determined by at least a portion of the technique(s) described in relation to FIG. 1. The taste cluster shares at least one shared tag with the one or more user tags and with the one or more item tags. For example, a taste cluster with cluster tags including "sports", "simulation", "cartoon", and "baseball" shares two shared tags with an item with item tags including "sports" and "simulation". The taste cluster with cluster tags including "sports", "simulation", "cartoon", and "baseball" shares three shared tags with a user with user tags including "casual", "sports", "cartoon", "cooperative", and "baseball". The "sports" tag is shared between all three of the user tags, cluster tags, and item tags.

The method 220 further includes affiliating at least one item of the plurality of items with the taste cluster based at least partially on the shared tag at 228 and affiliating the user with the taste cluster based at least partially on the shared tag at 230. In some embodiments, affiliating the at least one item of the plurality of items with the taste cluster includes calculating an item affiliation score, such as described in relation to FIG. 1. For example, the item affiliation score may be determined based at least partially on a cosine similarity between an item embedding and a cluster embedding. The item embedding and cluster embedding may be vectors in a multi-dimensional vector space. By calculating a cosine (e.g., different in vector orientation) between the item embedding vector and the cluster embedding vector, the similarity (or difference) between the item embedding and cluster embedding is quantified as the item affiliation score. Similarly, the user affiliation score may be determined based at least partially on a cosine similarity between a user embedding and a cluster embedding. The user embedding and cluster embedding may be vectors in a multi-dimensional vector space. By calculating a cosine between the user embedding vector and the cluster embedding vector, the similarity (or difference) between the item embedding and cluster embedding is quantified as the user affiliation score. In some embodiments, other similarity scores are used, such as L2-distance and a dot product of two embedding vectors (e.g., user embedding vector, cluster embedding vector, item embedding vector).

In at least some embodiments, the method includes presenting, on a display, at least one presented item of the plurality of items affiliated with the taste cluster at 232. In some embodiments, the presented item is the item with the greatest combined affiliation score. For example, the combined affiliation score may be a summation of the item affiliation score and the user affiliation score. In another example, the combined affiliation score may be an average of the item affiliation score and the user affiliation score.

In yet another example, the combined affiliation score may be a weighted average of the item affiliation score and the user affiliation score, such as a weighted average that places a greater emphasis on the user affiliation score. In such an example, the framework calculates a combined affiliation score based on prioritizing the user's affiliation with the taste cluster over the item's affiliation with the taste cluster such that the user is presented with a recommendation from the taste cluster they are most aligned with, even if the presented item is less closely affiliated with the taste cluster. In a further example, the combined affiliation score may be a weighted average of the item affiliation score and the user affiliation score, such as a weighted average that places a greater emphasis on the item affiliation score. In such an example, the framework calculates a combined affiliation score based on prioritizing the item affiliation with the taste cluster over the user affiliation with the taste cluster such that the user is presented with a recommendation that most accurate represents the taste cluster, even if the user is less closely affiliated with the taste cluster. Such weighted averages may allow for discovery of new items or new taste clusters with which the user would not otherwise engage. By quantifying the user affiliations and item affiliations, a technician or engineer can modify the framework or method 220 to change the presented items.

In some embodiments, the presented item is an item selected from the item database with the greatest combined affiliation score. In other embodiments, a presented item is the item with the highest item affiliation score for a selected taste cluster. For example, a plurality of taste clusters may be presented to a user in a user interface (e.g., the taste clusters associated with the greatest user affiliation scores) and one or more presented items are displayed for each taste cluster. In displaying a presented item for each taste cluster, a user may be presented with items that most accurately represent each taste cluster and provide the user with choices of recommendations. In a particular example, the method 220 presents to a user a first taste cluster associated with "story-driven", "realistic", and "military" tags, and the framework determines that Item #187 of the item database has the greatest item affiliation score with the first taste cluster; and the method 220 presents to the user a second taste cluster associated with "competitive", "online multiplayer", "team-based", and "science fiction", and the framework determines that Item #012 of the item database has the greatest item affiliation score with the second taste cluster. Item #187 and Item #012 may be both presented to the user as presented items, as each is determined to be representative of the first taste cluster and second taste cluster, respectively, even if other items affiliated with the first taste cluster have a greater combined affiliation score than the presented Item #012.

In other embodiments, a presented item is an item affiliated with the taste cluster with the greatest user affiliation score. For example, the user may have a user affiliation score indicating a strong affiliation with a taste cluster that is niche and does not have an item with a high item affiliation score. In some embodiments, the item with the greatest item affiliation score to the taste cluster with the greater user affiliation score may be the presented item. In doing so, the method attempts to identify the closest item to the user's niche preferences irrespective of the combined affiliation score.

In at least one embodiment, an affiliation score is presented to the user with the presented item. For example, a combined affiliation score may be presented to indicate to the user how closely affiliated the user's preferences are to the item's description. In other examples, a user affiliation score may be presented to indicate to the user how closely affiliated the user's preferences are to that type of item. In other examples, a user affiliation score may be presented to indicate to the user how closely affiliated the item's description is to a particular type of item (e.g., how representative the item is of that category of item).

In a particular example, a user's decision about whether to select or interact with an item is based on his/her preference with taste clusters, as well as the item's relatedness with them. Thus, the prediction score of user u and item i is calculated by multiplying their affiliations:

$$\hat{y}_{ui} = \text{sparse\_dot}(a_u, x_i)$$

where sparse_dot(·) denotes a sparse dot product for sparse vectors $a_u$ and $x_i$.

For each prediction $\hat{y}_{ui}$, the ECF framework generates an explanation by measuring the coherence between user affiliations and item affiliations. More specifically, the overlapped taste clusters are first derived from an affiliation matrix:

$$C_{ui} = S(a_u) \cap S(x_i)$$

where S(·) is an index selector to collect corresponding clusters where the affiliation between users/items and taste clusters exists, and $C_{ui}$ denotes the set of overlapped taste clusters for user u and item i. Thus, the descriptive tags of taste clusters in $C_{ui}$ are used to interpret what determines user u preference toward item i. Moreover, importance score $\omega_{ui}^c$ is introduced to quantify the contribution of each taste cluster in $C_{ui}$:

$$\omega_{ui}^c = a_{uc} \times x_{ic}$$

Therefore, ECF is able to explain the prediction decision by using the descriptive tags of overlapped taste clusters $C_{ui}$ and their corresponding importance scores $\omega_{ui}^c$. Due to the sparsity of affiliation matrix, the size of overlapped taste clusters is small, so that we could easily derive the readable decision logic of ECF by investigating only a few taste clusters.

Figure 3:
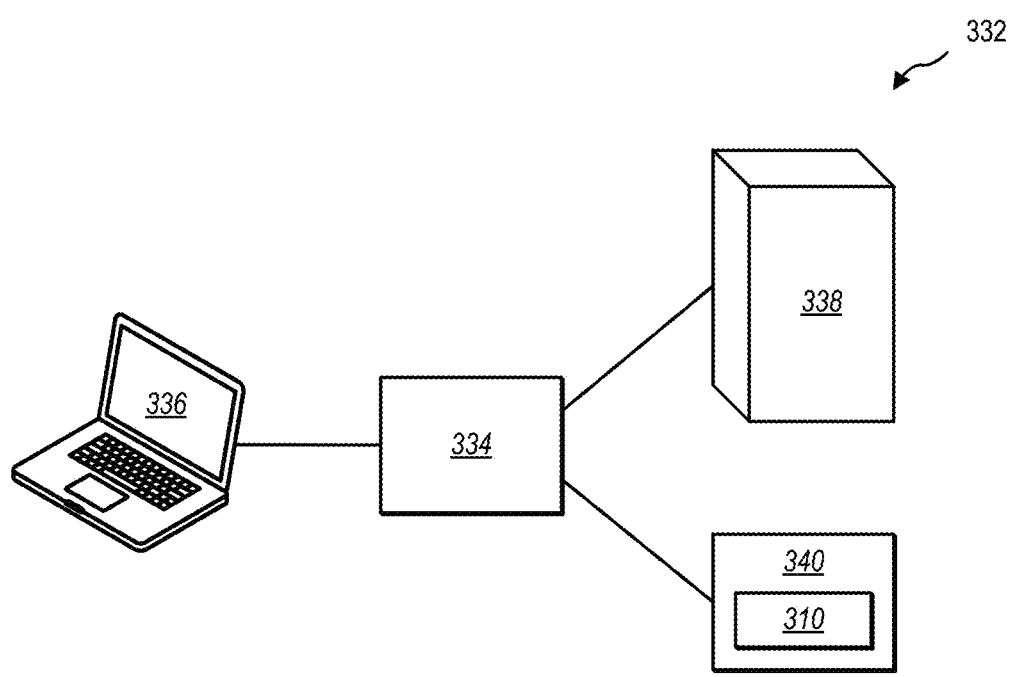
FIG. 3 is a schematic representation of a system including an embodiment of an ECF framework, according to at least some embodiments of the present disclosure.

As described herein, the framework may obtain the plurality of known tags, user information, item information, and other inputs to the framework from a plurality of sources. FIG. 3 is a schematic representation of a system 332 including an embodiment of an ECF framework 334 in communication with a client device 336, a platform server 338, and a database server 340. In some embodiments, the ECF framework 334 obtains user information from a platform server 338 that manages or stores a user profile for the user thereon. The platform server 338 may record interactions and usage of the user profile with a plurality of items associated with the item database 310 stored on the database server 340. In some embodiments, the ECF framework 334 further obtains user information from the client device 336 used by the user to interact with items associated with the item database 310. In some embodiments, the ECF framework 334 further obtains item information, such as tags, from reviews and other user-generated content generated on the client device 336 and/or stored on the platform server 338. In doing so, the ECF framework may assign tags and other descriptions to the items of the item database 310 beyond the plurality of tags of the item database 310.

In some embodiments, the ECF framework 334 operates on a computing device, such as a server computer, containing at least a processor and hardware storage device. In some embodiments, the processor(s) is a central processing unit (CPU) that performs general computing tasks for the computing device. In some embodiments, the processor(s) is or is part of a system on chip (SoC) that is dedicated to controlling or communicating with one or more subsystems of the computing device. In some embodiments, the processor is in data communication with the hardware storage device to execute instructions stored thereon that cause the processor to perform any of the methods described herein.

In some embodiments, the hardware storage device(s) is a non-transitory computer readable media or storage device including any of RAM, ROM, EEPROM, CD-ROM or other optical disk storage (such as CDs, DVDs, etc.), magnetic disk storage or other magnetic storage devices, or any other media which can be used to store desired program code means in the form of computer-executable instructions or data structures and which can be accessed by a general purpose or special purpose computer.

Figure 4:
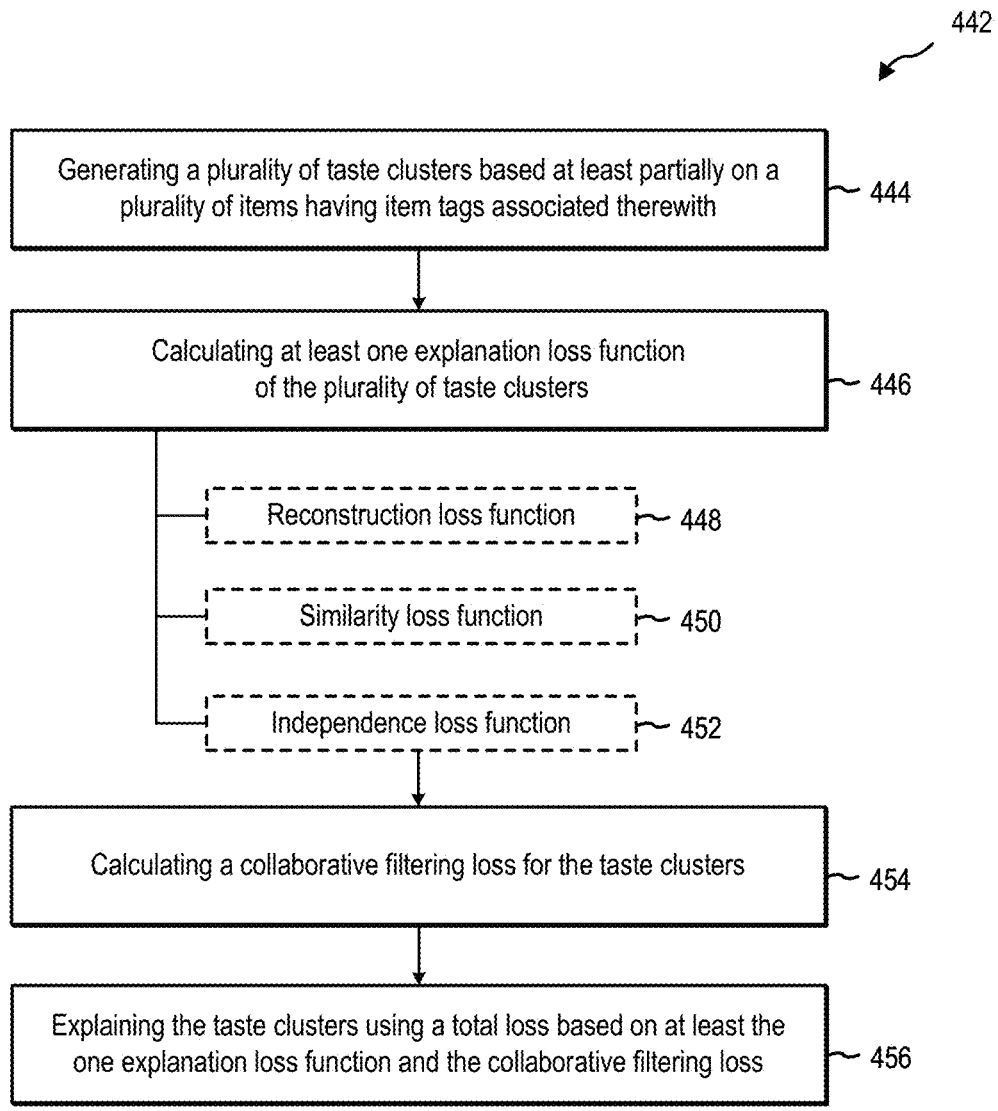
FIG. 4 is a flowchart illustrating an embodiment of a method of training an ECF model or framework, according to at least some embodiments of the present disclosure.

FIG. 4 is a flowchart illustrating an embodiment of a method 442 of training an ECF model or framework, such as those described herein. The method 442 includes generating a plurality of taste clusters at 444 based at least partially on a plurality of items having item tags associated therewith. In some embodiments, the taste clusters are generated as described or similarly to as described above.

The taste clusters are evaluated and refined through training of the ECF model or framework by calculating at least one explanation loss function at 446. In some embodiments, training the ECF model at 446 is performed according to a plurality of loss functions. In some embodiments, training the ECF model at 446 includes training the ECF model according to at least one of a reconstruction loss function at 448, a tag similarity loss function at 450, and an independence loss function at 452. In at least one embodiment, the method 442 includes training the ECF model according to each of a reconstruction loss function at 448, a tag similarity loss function at 450, and an independence loss function at 452.

In some embodiments, the method 442 includes training the ECF model according to a reconstruction loss function at 448 using a Bayesian personalized ranking (BPR) loss according to:

$$\mathcal{L}_{CS} = \sum\nolimits_{(u,i,j) \in O} -\ln\sigma(\hat{y}_{ui} - \hat{y}_{uj})$$

where $O=\{(u, i, j)|y_{ui}=1, y_{uj}=0\}$ denotes the training set of user-item interactions. The BPR loss or other reconstruction loss function allows the method 442 to compare the prediction of the ECF model to the user's preferences, refining the predictions over time. The BPR loss or other reconstruction loss function calculates the loss value associated with the difference between the recommendation at the user's preference.

In some embodiments, the method 442 includes a tag similarity loss function at 450. The tag similarity loss function quantifies the informativeness of tags. For example, the items in a taste cluster should share item tags with one another. In at least one example, a taste cluster affiliated with items that each share one item tag with a cluster tag of the taste cluster, but the items of share few or no item tags in common with one another, the informativeness of the cluster tags may be low. In other words, the cluster tags should precisely describe to a user or engineer the items of the cluster.

In some embodiments, the tag similarity loss function includes calculating the tag distribution of taste clusters:

$$\tilde{D} = X^T E$$

where E is a multi-hot matrix, and each entry $e_{it}$ indicates whether item i has the tag t, and $\tilde{D}$ represents the tag frequency of each taste cluster. In some embodiments, the ECF model directly selects the most frequent item tags as the cluster tags or other description of a given taste cluster. However, a direct selection of the most frequent item tags as cluster tags may result in the indistinguishability between different clusters, since some item tags are shared by many items, and those item tags shared by many items would dominate the cluster tag distribution across different taste clusters. For example, a Microsoft Xbox dataset may include a plurality of game applications. Most of the game applications contain online functionality and allow for multiplayer, and, therefore, selecting the "Online Multiplayer" cluster tag fails to provide an informative or unique cluster tag for taste clusters. To tackle this problem, we first reweight each item tag according to its frequency in item tags, and then compute the weighted distribution to select a cluster tag:

$$d_{ct} = \tilde{d}_{ct} \times \log\left(\frac{N}{f_t - \epsilon}\right)$$

where N is the number of items, $f_t$ is the frequency of tag/across all items, and $\epsilon$ is a small fraction to avoid numerical overflow. In some embodiments, $\epsilon$ is set to no more than $10^{-6}$. Thus, the above equation considers both tag frequency and items' affiliations for tag informativeness: the more frequently the distinctive tag appears, the more informative it is for interpreting the taste cluster.

In some embodiments, to facilitate the understanding of taste clusters, the number of cluster tags generated for taste clusters is in a range that provides accuracy while providing distinctiveness. For example, too large of a number of cluster tags may render the taste cluster too abstract or too complex to identify users' true interests, thus making the taste cluster and cluster tags associated therewith difficult to interpret. In some embodiments, the tag similarity loss function at 450 further includes normalizing tag frequencies as:

$$\beta_{ct} = \frac{\exp(d_{ct}/\tau)}{\sum\nolimits_{c_j \in \tau}\exp(d_{ct}/\tau)}$$

where $\tau$ is the temperature hyperparameter. For low temperatures (low $\tau$), the distribution of the above equation becomes sharper, and only the cluster tag with highest score stands out. As the temperature increases (increasing $\tau$), the distribution becomes more even and the distinctiveness between tags will decrease. In some embodiments, the tag similarity loss function then considers maximizing the likelihood of the probabilities of Top-P tags so that the taste clusters can be easily interpreted by those tags:

$$\mathcal{L}_{TS} = \sum\nolimits_{c \in C}\sum\nolimits_{l \in argTopP(\beta_c)} -\log\beta_{ct}$$

where C denotes the set of taste clusters. In some embodiments, the number of tags is set at P=4. For example, P=4 may achieve a good balance between informativeness and readability.

In some embodiments, the independence loss function at 452 quantifies the difference(s) between taste clusters to present different user interest spaces. For example, different taste clusters contain different items and reveal different user preferences so that the latent interest space could be better preserved. In some embodiments, the independence loss function includes one or more of distance correlation, orthogonality, and mutual information. In at least one embodiment, the independence loss function includes mutual information due to simplicity and efficiency. The independence loss function includes:

$$\mathcal{L}_{IND} = \sum\nolimits_{c \in C} -\log\frac{\exp(s(h_C, h_C))}{\sum\nolimits_{c' \in C}\exp(s(h_c, h_c))}$$

where $s(\cdot)$ is the similarity function to measure the associations of any two taste clusters. In some embodiments, as described herein, the similarity function is a cosine similarity function.

As described herein, in some embodiments, the explanation loss function includes each of the reconstruction loss at 448, the tag similarity loss function at 450, and the independence loss function at 452. For example, the taste clusters may be trained by summing the above objective functions:

$$\mathcal{L}_{TC} = \mathcal{L}_{CS} + \mathcal{L}_{TS} + \mathcal{L}_{IND}$$

In some embodiments, there is no further tuning or weighting coefficients for each loss, since each of them defines an essential aspect that the taste clusters should accomplish. However, in some embodiments, such as due to the argTop operations in affiliation selections, supervised signals are sparse and hard to converge. To partially or fully compensate for such limitations of the supervised signals, the method 442 includes, in some embodiments, adding auxiliary supervised signals from user-item predictions (e.g., collaborative filtering loss) at 454:

$$\mathcal{L}_{CF} = \sum_{(u,i,j) \in O} -\ln\sigma(e_u^T v_i - e_u^T v_j)$$

where $e_u$ denotes the embeddings of user u. In some embodiments, such as the above equation, the collaborative filtering loss includes the inner product of embeddings to measure the similarity between users and items. In some embodiments, other embedding-based models can also be applied.

In some embodiments, by combining the taste clusters explanation loss (such as the reconstruction loss at 448, the tag similarity loss function at 450, the independence loss function at 452, or combinations thereof) and collaborative filtering loss, the method 442 may reduce and/or minimize the following objective function to learn the ECF model parameters:

$$\mathcal{L}_{ECF} = \mathcal{L}_{TC} + \lambda \mathcal{L}_{CF}$$

where $\lambda$ is a hyperparameter to control the impact of auxiliary collaborative signals.

In some embodiments, an ECF framework and/or model according to the present disclosure allows quantitative metrics to explain the taste clusters at 456 and/or evaluate the effectiveness of the explanation related to the taste clusters described herein. In some embodiments, the quantitative metrics include one or more of the in-cluster item coverage of the taste cluster, the tag utilization of the taste cluster, the silhouette of the taste cluster, and the informativeness of the taste cluster.

Figure 5:
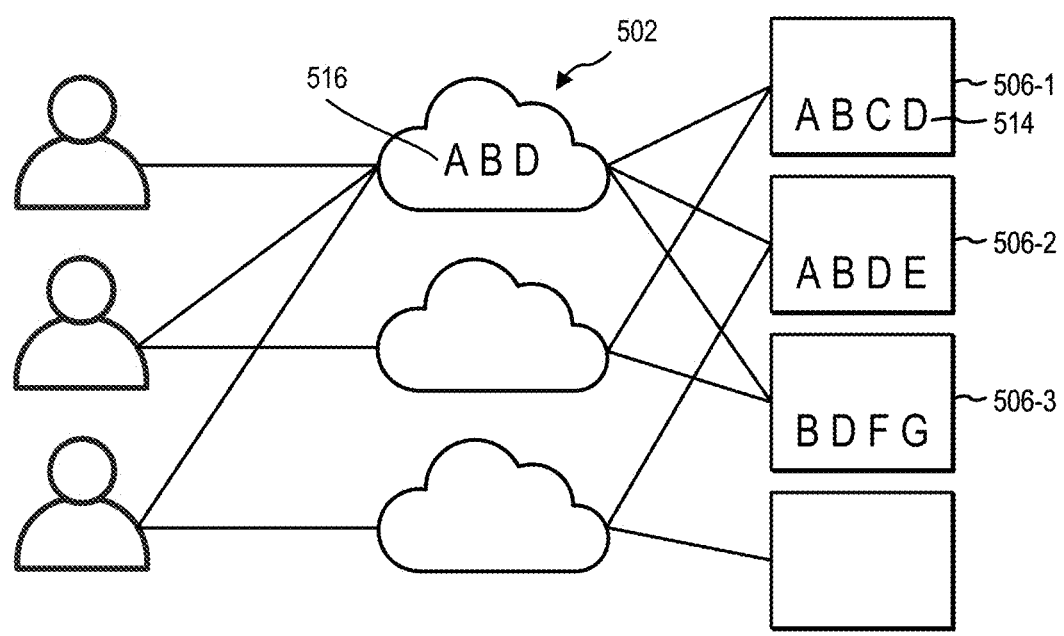
FIG. 5 illustrates an example of in-cluster item coverage of the taste cluster, according to at least some embodiments of the present disclosure.

For example, FIG. 5 illustrates an example of in-cluster item coverage of the taste cluster 502. In some embodiments, in-cluster item coverage quantifies the proportion of items in the taste cluster that the selected tags can cover:

$$C = \frac{1}{Z} \sum_{c \in C} \sum_{i \in c} \frac{\mathbb{I}(\tau_i \cap \tau_C)}{|c|}$$

where $\mathbb{I}(\cdot) = 1$ when the item and taste cluster share at least one tag, and otherwise $\mathbb{I}(\cdot) = 0$, and where C is the coverage metric value. When the coverage metric value is high, we deem that these tags can be properly used as the descriptive interpretation for the taste cluster.

In some embodiments, the taste cluster 502 includes cluster tags 516 (e.g., A, B, and D) and the coverage metric quantifies how closely the item tags 514 of the items 506-1, 506-2, 506-3 associated with the taste cluster 502 align with the cluster tags 516. For example, all cluster tags 516 match the item tags 514 of the first item 506-1 and the second item 506-2, but only two of the three cluster tags 516 match the item tags 514 of the third item 506-3.

Figure 6:
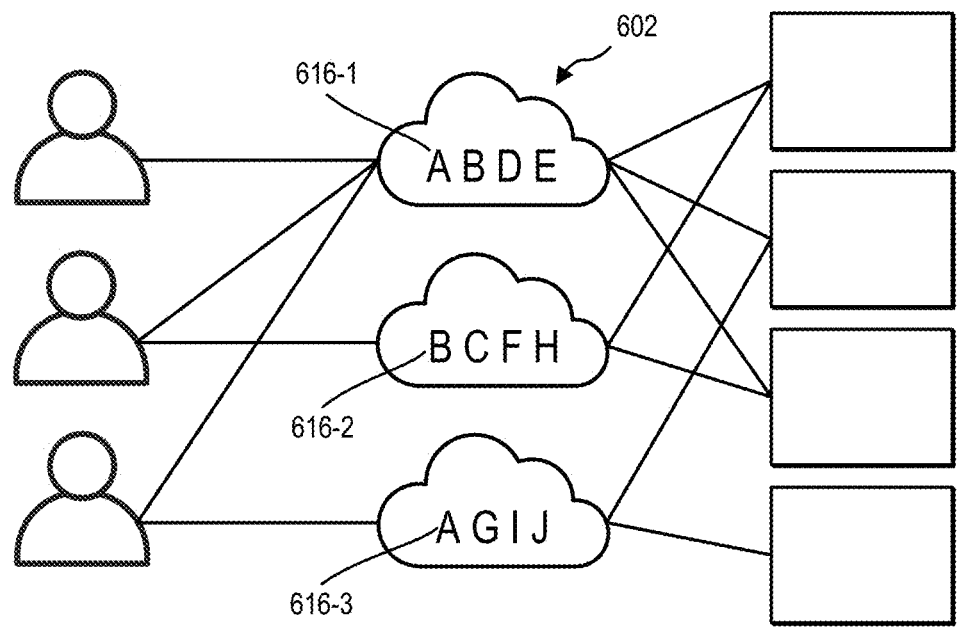
FIG. 6 illustrates an example of tag utilization of the taste cluster, according to at least some embodiments of the present disclosure.

FIG. 6 illustrates an example of tag utilization of the taste cluster 602. In some embodiments, the tag utilization of the taste cluster represents how many unique tags are used for interpreting taste clusters:

$$U = \frac{1}{|\tau|} \bigcup_{c \in C} \tau_c$$

where U is the tag utilization metric. The tag utilization metric unions all the selected tags from each taste cluster, and a higher tag utilization indicates a more diverse interpretation of interest patterns.

For example, the cluster tags 616-1, 616-2, 616-3 contain tags ranging from "A" through "J" with the first set of cluster tags 616-1 and second set of cluster tags 616-2 being unique except for "B", and the third set of cluster tags 616-3 sharing only "A" with the first set of cluster tags 616-1. The remaining cluster tags are all unique, producing a high tag utilization metric indicating the taste clusters 602 are distinct from one another and represent a diverse interpretation of interest patterns.

Figure 7:
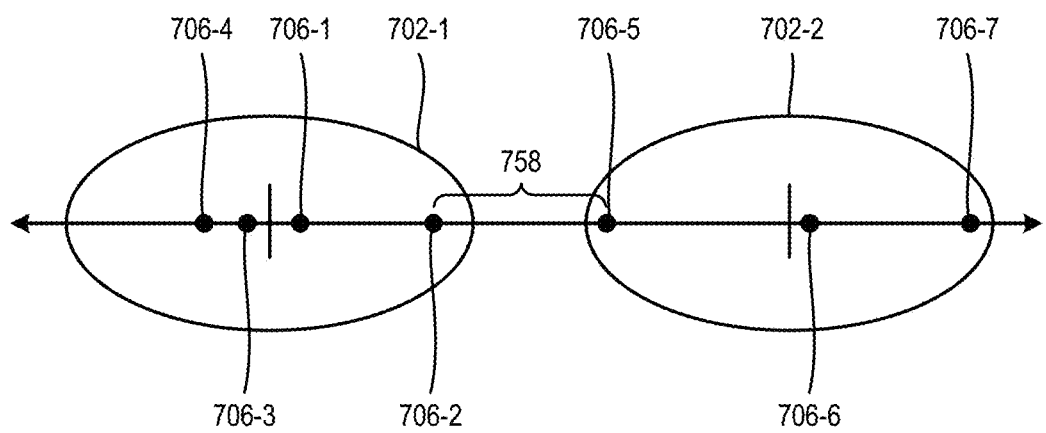
FIG. 7 illustrates a schematic illustration of a silhouette of taste clusters, according to at least some embodiments of the present disclosure.

FIG. 7 illustrates a schematic illustration of a silhouette of taste clusters. In some embodiments, the silhouette of the taste cluster is a clustering metric which measures the similarity difference between intra-cluster items and inter-cluster items:

$$S = \frac{1}{|I|} \sum_{i \in I} \frac{b(i) - a(i)}{\max\{a(i), b(i)\}}$$

where S is the silhouette metric, a(i) is the mean distance between item i and other items in the same taste cluster, and b(i) is the smallest distance of item i to all items in other taste clusters. In some embodiments, a high silhouette metric indicates the items are similar in the taste clusters.

For example, in the simplified schematic representation of FIG. 7, the items 706-1, 706-2, 706-3, 706-4, 706-5, 706-6, 706-7 are placed on a continuum based on item tag values, and the taste clusters 702-1, 702-2 are defined by ranges of item tag values associated with cluster tags. In some embodiments, the items 706-1, 706-2, 706-3, 706-4 of the first taste cluster 702-1 have a smaller mean distance from one another on the continuum than a delta 758 any of the items 706-1, 706-2, 706-3, 706-4 have to the nearest item 706-5 of the second taste cluster 702-2.

The informativeness of the taste cluster measures the distinctiveness of selected tags to represent the items in the taste cluster:

$$I = \frac{1}{|C|} \sum_{c_i \in C} \frac{|R(\tau_c) \cap c|}{|c|}$$

where I is the informativeness metric, and $R(T_c)$ is a post-hoc discriminator that predicts the most likely top |c| items given the tags of taste cluster c. In some embodiments, the robustness of the ECF model may be improved by randomly masking a portion (e.g., 50%) of the item's tags for training. After training, the ECF model may use the cluster tags as the input and collect the top $|c_i|$ items as $R(T_{ci})$ by ranking their prediction probabilities. The higher informativeness means that those cluster tags are more accurate to describe the items affiliated with the taste cluster.

The above four quantitative metrics measure different qualities of taste clusters. As ECF depends on the precision, accuracy, and uniqueness of the taste clusters to make recommendations and explanations, these metrics can be also viewed as the evaluation of explanation.

The present disclosure relates to systems and methods for providing recommendations to a user according to at least the examples provided in the sections below:

[A1] In some embodiments, a method for providing recommendations to a user includes assigning one or more item tags from a known set of tags to one or more items of a plurality of items; assigning one or more user tags from the known set of tags to a user; determining at least one taste cluster having one or more cluster tags from the known set of tags, wherein the taste cluster shares at least one shared tag with the one or more user tags and with the one or more item tags; affiliating at least one item of the plurality of items with the taste cluster based on the shared tag; affiliating the user with the taste cluster based on the shared tag; and presenting to the user at least one presented item of the plurality of items affiliated with the taste cluster.

[A2] In some embodiments, the method of [A1] further includes calculating a user affiliation score between the user and the taste cluster based on the one or more cluster tags and the one or more user tags, and wherein the at least one presented item is selected from the plurality of items based at least partially on the user affiliation score.

[A3] In some embodiments, the user affiliation score of [A2] is calculated by a cosine similarity between a user embedding vector and a cluster embedding vector.

[A4] In some embodiments, the method of any of [A1] through [A3] includes calculating an item affiliation score between the at least one item and the taste cluster based on the one or more cluster tags and the one or more item tags, and the at least one presented item is selected from the plurality of items based at least partially on the item affiliation score.

[A5] In some embodiments, the item affiliation score of [A4] is calculated by a cosine similarity between an item embedding vector and a cluster embedding vector.

[A6] In some embodiments, the method of any of [A1] through [A5] includes calculating a user affiliation score between the user and the taste cluster based on the one or more cluster tags and the one or more user tags and presenting to the user the at least one presented item includes presenting to the user the user affiliation score with the at least one presented item.

[A7] In some embodiments, the method of any of [A1] through [A6] includes calculating an item affiliation score between the at least one item and the taste cluster based on the one or more cluster tags and the one or more item tags and presenting to the user the at least one presented item includes presenting to the user the item affiliation score with the at least one presented item.

[A8] In some embodiments, the method of any of [A1] through [A7] includes calculating a combined affiliation score of the at least presented item and the user.

[A9] In some embodiments, assigning one or more user tags from the known set of tags to a user of any of [A1] through [A8] includes calculating a user embedding vector.

[A10] In some embodiments, assigning one or more item tags from the known set of tags to an item of any of [A1] through [A9] includes calculating an item embedding vector for the item.

[A11] In some embodiments, the method of any of [A1] through [A10] includes obtaining item tags from an item database.

[A12] In some embodiments, the method of any of [A1] through [A11] includes obtaining user information from a platform server.

[B1] In some embodiments, a method of training an explainable collaborative filtering model includes generating a plurality of taste clusters based at least partially on a plurality of items having item tags associated therewith; calculating at least one explanation loss function of the plurality of taste clusters; calculating a collaborative filtering loss for the taste clusters; and explaining the taste clusters using a total loss based on at least the at least one explanation loss function and the collaborative filtering loss.

[B2] In some embodiments, the loss function of [B1] includes a reconstruction loss function.

[B3] In some embodiments, the loss function of [B1] or [B2] includes a tag similarity loss function.

[B4] In some embodiments, the loss function of any of [B1] through [B3] includes an independence loss function.

[B5] In some embodiments, the loss function of any of [B1] through [B4] includes a summation of reconstruction loss, tag similarity loss, and independence loss.

[C1] In some embodiments, a non-transitory computer readable media has instructions stored thereon that, when executed by a processor of a computing device, cause the computer device to assign one or more item tags from a known set of tags to one or more items of a plurality of items; assign one or more user tags from the known set of tags to a user; determine at least one taste cluster having one or more cluster tags from the known set of tags, wherein the taste cluster shares at least one shared tag with the one or more user tags and with the one or more item tags; affiliate at least one item of the plurality of items with the taste cluster based on the shared tag; affiliate the user with the taste cluster based on the shared tag; and present to the user at least one presented item of the plurality of items affiliated with the taste cluster.

[C2] In some embodiments, the instructions of [C1] cause the computing device to calculate at least one explanation loss function of the plurality of taste clusters, calculate a collaborative filtering loss for the taste clusters, and explain the taste clusters using a combined loss based on at least the at least one explanation loss function and the collaborative filtering loss.

[C3] In some embodiments, the instructions of [C1] or [C2] further cause the computing device to calculate a combined affiliation score for the at least one presented item.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the scope of the present disclosure, and that various changes, substitutions, and alterations may be made to embodiments disclosed herein without departing from the scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for providing recommendations to a user, the method comprising:
    assigning one or more item tags from a known set of tags to one or more items of a plurality of items;
    assigning one or more user tags from the known set of tags to a user;
    determining at least one taste cluster having one or more cluster tags from the known set of tags, wherein the taste cluster shares at least one shared tag with the one or more user tags and with the one or more item tags;
    affiliating at least one item of the plurality of items with the taste cluster based on the shared tag;
    affiliating the user with the taste cluster based on the shared tag; and
    presenting to the user at least one presented item of the plurality of items affiliated with the taste cluster and presenting to the user at least one of an item affiliation score, a user affiliation score, and a combined affiliation score with the at least one presented item.

2. The method of claim 1 further comprising calculating the user affiliation score between the user and the taste cluster based on the one or more cluster tags and the one or more user tags, and
    wherein the at least one presented item is selected from the plurality of items based at least partially on the user affiliation score.

3. The method of claim 2, wherein the user affiliation score is calculated by a cosine similarity between a user embedding vector and a cluster embedding vector.

4. The method of claim 1 further comprising calculating the item affiliation score between the at least one item and the taste cluster based on the one or more cluster tags and the one or more item tags, and
    wherein the at least one presented item is selected from the plurality of items based at least partially on the item affiliation score.

5. The method of claim 4, wherein the item affiliation score is calculated by a cosine similarity between an item embedding vector and a cluster embedding vector.

6. The method of claim 1 further comprising calculating the user affiliation score between the user and the taste cluster based on the one or more cluster tags and the one or more user tags, and
    wherein presenting to the user the at least one presented item includes presenting to the user the user affiliation score with the at least one presented item.

7. The method of claim 1 further comprising calculating the item affiliation score between the at least one item and the taste cluster based on the one or more cluster tags and the one or more item tags, and
    wherein presenting to the user the at least one presented item includes presenting to the user the item affiliation score with the at least one presented item.

8. The method of claim 1 further comprising calculating the combined affiliation score of the at least presented item and the user.

9. The method of claim 1, wherein assigning one or more user tags from the known set of tags to a user includes calculating a user embedding vector.

10. The method of claim 1, wherein assigning one or more item tags from the known set of tags to an item includes calculating an item embedding vector for the item.

11. The method of claim 1, further comprising obtaining item tags from an item database.

12. The method of claim 1, further comprising obtaining user information from a platform server.

13. A method of training an explainable collaborative filtering model, the method comprising:
    generating a plurality of taste clusters based at least partially on a plurality of items having item tags associated therewith;
    calculating at least one explanation loss function of the plurality of taste clusters;
    calculating a collaborative filtering loss for the taste clusters; and
    explaining the taste clusters using a total loss based on at least the at least one explanation loss function and the collaborative filtering loss.

14. The method of claim 13, wherein the loss function includes a reconstruction loss function.

15. The method of claim 13, wherein the loss function includes a tag similarity loss function.

16. The method of claim 13, wherein the loss function includes an independence loss function.

17. The method of claim 13, wherein the loss function includes a summation of reconstruction loss, tag similarity loss, and independence loss.

18. A non-transitory computer readable media having instructions stored thereon that, when executed by a processor of a computing device, cause the computer device to:
- assign one or more item tags from a known set of tags to one or more items of a plurality of items;
- assign one or more user tags from the known set of tags to a user;
- determine at least one taste cluster having one or more cluster tags from the known set of tags, wherein the taste cluster shares at least one shared tag with the one or more user tags and with the one or more item tags;
- affiliate at least one item of the plurality of items with the taste cluster based on the shared tag;
- affiliate the user with the taste cluster based on the shared tag; and
- present to the user at least one presented item of the plurality of items affiliated with the taste cluster and present to the user at least one of an item affiliation score, a user affiliation score, and a combined affiliation score with the at least one presented item.

19. The computer readable media of claim 18 further configured to cause the computing device to:
- calculate at least one explanation loss function of the plurality of taste clusters,
- calculate a collaborative filtering loss for the taste clusters, and
- explain the taste clusters using a combined loss based on at least the at least one explanation loss function and the collaborative filtering loss.

20. The computer readable media of claim 18, wherein the instructions further cause the computing device to calculate a combined affiliation score for the at least one presented item.

* * * * *